(12) United States Patent
Kirsch

(10) Patent No.: US 6,754,801 B1
(45) Date of Patent: Jun. 22, 2004

(54) METHOD AND APPARATUS FOR A SHIFT REGISTER BASED INTERCONNECTION FOR A MASSIVELY PARALLEL PROCESSOR ARRAY

(75) Inventor: Graham Kirsch, Hants (GB)

(73) Assignee: Micron Technology, Inc., Boise, ID (US)

( * ) Notice: Subject to any disclaimer, the term of this patent is extended or adjusted under 35 U.S.C. 154(b) by 688 days.

(21) Appl. No.: 09/642,774

(22) Filed: Aug. 22, 2000

(51) Int. Cl.$^7$ .................................................. G06F 15/00
(52) U.S. Cl. ........................................ 712/14; 712/22
(58) Field of Search .................................... 712/14, 22

(56) References Cited

U.S. PATENT DOCUMENTS

| | | | | |
|---|---|---|---|---|
| 4,720,780 A | * | 1/1988 | Dolecek | 712/18 |
| 5,581,773 A | | 12/1996 | Glover | 712/14 |
| 5,638,533 A | | 6/1997 | Law | 711/157 |
| 5,727,229 A | | 3/1998 | Kan et al. | 712/22 |
| 5,963,746 A | | 10/1999 | Barker et al. | 712/20 |
| 5,968,160 A | * | 10/1999 | Saito et al. | 712/14 |
| 6,049,859 A | * | 4/2000 | Gliese et al. | 712/17 |
| 6,061,367 A | | 5/2000 | Siemers | 712/33 |
| 6,308,251 B1 | * | 10/2001 | Hashiguchi | 712/16 |

FOREIGN PATENT DOCUMENTS

| | | |
|---|---|---|
| EP | 0 463 721 A2 | 2/1992 |
| GB | 2 203 574 A | 10/1988 |
| GB | 2203574 A | * 10/1988 ........... G06F/13/00 |
| WO | WO 90/16031 A1 | 12/1990 |

OTHER PUBLICATIONS

Michael J. Flynn, "Very High–Speed Computing Systems," Proceedings of the IEEE, vol. 54, No. 12, Dec. 1966, pp. 1901–1909.

Norman Margolus, "An Embedded DRAM Architecture for Large–Scale Spatial–Lattice Computations," Computer Architecture News Conference, vol. 28, No. 2, May 2000; pp. 149–160.

Fuzion 150 Product Overview, PixelFusion Ltd, PFL/004/99 v2. Revised Jan. 2000.

Gamma II Plus Technical Overview (visited Jul., 2000) <http://www.cppus.com/techoverview.pdf>.

* cited by examiner

Primary Examiner—Eric Coleman
(74) Attorney, Agent, or Firm—Dickstein Shapiro Morin & Oshinsky LLP

(57) ABSTRACT

A system and method for using wider data paths within Processing Elements (PEs) of a Massively Parallel Array (MPP) to speed the computational performance of the PEs and the MPP array while still allowing for use of the simple 1-bit interconnection network to transfer data between PEs in the MPP is disclosed. A register having a data width equal to the data width of the PE for holding data for movement from one PE to another is provided in each PE. The register can be loaded in parallel within the PE, and operated as a shift register to transfer a full data width word from one PE to another PE using a 1-bit wide serial interconnection.

42 Claims, 4 Drawing Sheets

METHOD AND APPARATUS FOR A SHIFT REGISTER BASED INTERCONNECTION FOR A MASSIVELY PARALLEL PROCESSOR ARRAY

BACKGROUND OF THE INVENTION

1. Field of the Invention

The present invention relates to the field of computer memory devices and, more particularly to the interconnections between processing elements in a massively parallel processor array.

2. Description of the Related Art

The fundamental architecture used by all personal computers (PCs) and workstations is generally known as the von Neumann architecture, illustrated in block diagram form in FIG. 1. In the von Neumann architecture, a main central processing unit (CPU) 10 is used to sequence its own operations using a program stored in a memory 12. The memory 12, referred to herein as "main memory", also contains the data on which the CPU 10 operates. In modern computer systems, a hierarchy of cache memories is usually built into the system to reduce the amount of traffic between the CPU 10 and the main memory 12.

The von Neumann approach is adequate for low to medium performance applications, particularly when some system functions can be accelerated by special purpose hardware (e.g., 3D graphics accelerator, digital signal processor (DSP), video encoder or decoder, audio or music processor, etc.). However, the approach of adding accelerator hardware is limited by the bandwidth of the link from the CPU/memory part of the system to the accelerator. The approach may be further limited if the bandwidth is shared by more than one accelerator. Thus, the processing demands of large data sets, such as those commonly associated with large images, are not served well by the von Neumann architecture. Similarly, as the processing becomes more complex and the data larger, the processing demands will not be met even with the conventional accelerator approach.

It should be noted, however, that the von Neumann architecture has some advantages. For example, the architecture contains a homogenous memory structure allowing large memories to be built from many smaller standard units. In addition, because the processing is centralized, it does not matter where the data (or program) resides in the memory. Finally, the linear execution model is easy to control and exploit. Today's operating systems control the allocation of system memory and other resources using these properties. The problem is how to improve processing performance in a conventional operating system environment where multiple applications share and partition the system resources, and in particular, the main memory.

One solution is to utilize active memory devices, as illustrated in FIG. 2, in the computer system. Put simply, active memory is memory that can do more than store data; it can process it too. To the CPU 10 the active memory looks normal except that it can be told to do something with the data contents and without the data being transferred to the CPU or another part of the system (via the system bus). This is achieved by distributing processing elements (PEs) 14 through out the memory structure, which can all operate on their own local pieces of memory in parallel. In addition, the PEs 14 typically communicate with each other, as illustrated in FIG. 3, to exchange data. Thus, active memory encourages a somewhat different view of the computer architecture, i.e., "memory centered" or viewed from the data rather than the processor.

In a computer system having active memory, such as illustrated in FIG. 2, the work of the CPU 10 is reduced to the operating system tasks, such as scheduling processes and allocating system resources and time. Most of the data processing is performed within the memory 12. By having a very large number of connections between the main memory 12 and the processing resources, i.e., the PEs 14, the bandwidth for moving data in and out of memory is greatly increased. A large number of parallel processors can be connected to the memory 12 and can operate on their own area of memory independently. Together these two features can provide very high performance.

There are several different topologies for parallel processors. One example topology is commonly referred to as SIMD (single instruction, multiple data). The SIMD topology contains many processors, all executing the same stream of instructions simultaneously, but on their own (locally stored) data. The active memory approach is typified by SIMD massively parallel processor (MPP) architectures. In the SIMD MPP, a very large number of processors (usually a thousand or more) of relatively simple PEs are closely connected to a memory and organized so that each PE has access to its own piece of memory. All of the PEs execute the same instruction together, but on different data. The instruction stream is generated by a controlling sequencer or processor.

The SIMD MPP has the advantage that the control overheads of the system are kept to a minimum, while maximizing the processing and memory access bandwidths. SIMD MPPs, therefore, have the potential to provide very high performance very efficiently. Moreover, the hardware consists of many fairly simple repeating elements. Since the PEs are quite small in comparison to a reduced instruction set computer (RISC), they are quick to implement into a system design and their benefit with respect to optimization is multiplied by the number of processing elements. In addition, because the PEs are simple, it is possible to clock them fast and without resorting to deep pipelines.

In a massively parallel processor array the interconnections between processing elements, as illustrated in FIG. 3, are an important feature for exchanging data during processing. In conventional MPPs, the mechanism for the PEs to communicate with one another is usually achieved by means of a simple network of wires, as illustrated in FIG. 3, which are used to transfer data from one PE to its neighbors using a shift instruction. Thus, each PE simultaneously drives the value of a register out on its interconnection wire, and loads a register from one of its interconnection inputs. Many SIMD MPP's have used single bit PE's so the interconnections between PEs are implemented using a single wire per PE and a bit serial mode of operation. Accordingly, a single bit interconnection between processing elements is natural in such an array. As wider processing elements have been developed, however, a bit serial method of inter-processor data exchange has not fit well with the storage of data in the processing elements 14. For example, recent implementations of MPPs have used wider data paths, such as for example 8 bits, to speed the computational performance of the PEs and the MPP array. However, the level of usage of the interconnection network does not always warrant the use of a data channel as wide as the data width supported by the PEs, simply because data movement does not require as many cycles as computation in a typical application algorithm. In other words, the processor will spend more time dong calculations than moving data from one PE to another.

Because of this, even when the PE bandwidth in an MPP is quite wide, the interconnection paths between the PEs has remained only 1-bit wide. Recently it has become possible to connect a PE to its memory with a full data width connection, especially with the advent of single chip MPPs. Accordingly, there is a desire and need for a SIMD MPP main memory device that allows for the use of wider data paths within the PEs to speed the computational performance of the PEs and the MPP array while still allowing for use of the simple 1-bit interconnection network to transfer data between PEs in the MPP.

SUMMARY OF THE INVENTION

The present invention mitigates the problems of the conventional MPPs by providing a system and method for using wider data paths within the PEs to speed the computational performance of the PEs and the MPP array while still allowing for use of the simple 1-bit interconnection network to transfer data between PEs in the MPP.

The above and other features and advantages of the invention are achieved by providing a register having a data width equal to the data width of the PE for holding data for movement from one PE to another. The register can be loaded in parallel within the PE, and operated as a shift register to transfer a full data width word from one PE to another PE using a 1-bit wide serial interconnection.

These and other advantages and features of the invention will become more readily apparent from the following detailed description of the invention which is provided in connection with the accompanying drawings.

DETAILED DESCRIPTION OF PREFERRED EMBODIMENTS

Figure 1:
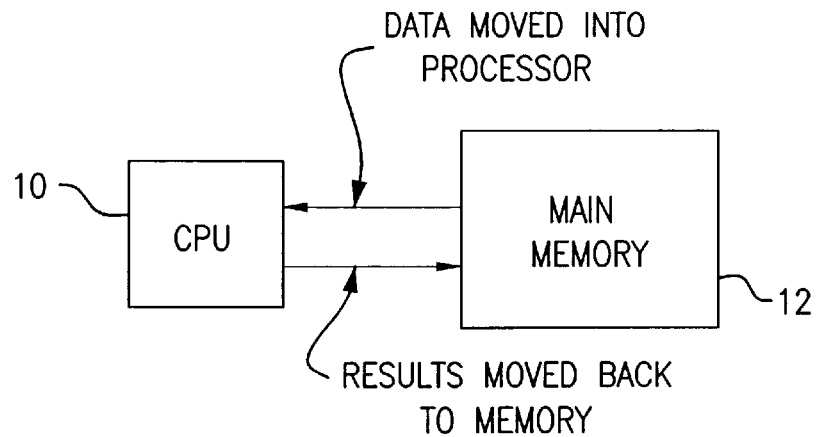
FIG. 1 illustrates in block diagram form a conventional computer architecture.

The present invention will be described as set forth in the exemplary embodiments illustrated in FIGS. 4–5. Other embodiments may be utilized and structural or logical changes may be made without departing from the spirit or scope of the present invention. Like items are referred to by like reference numerals.

In accordance with the present invention, a system and method for using wider data paths within the PEs to speed the computational performance of the PEs and the MPP array while still allowing for use of the simple 1-bit interconnection network to transfer data between PEs in the MPP is provided.

Figure 3:
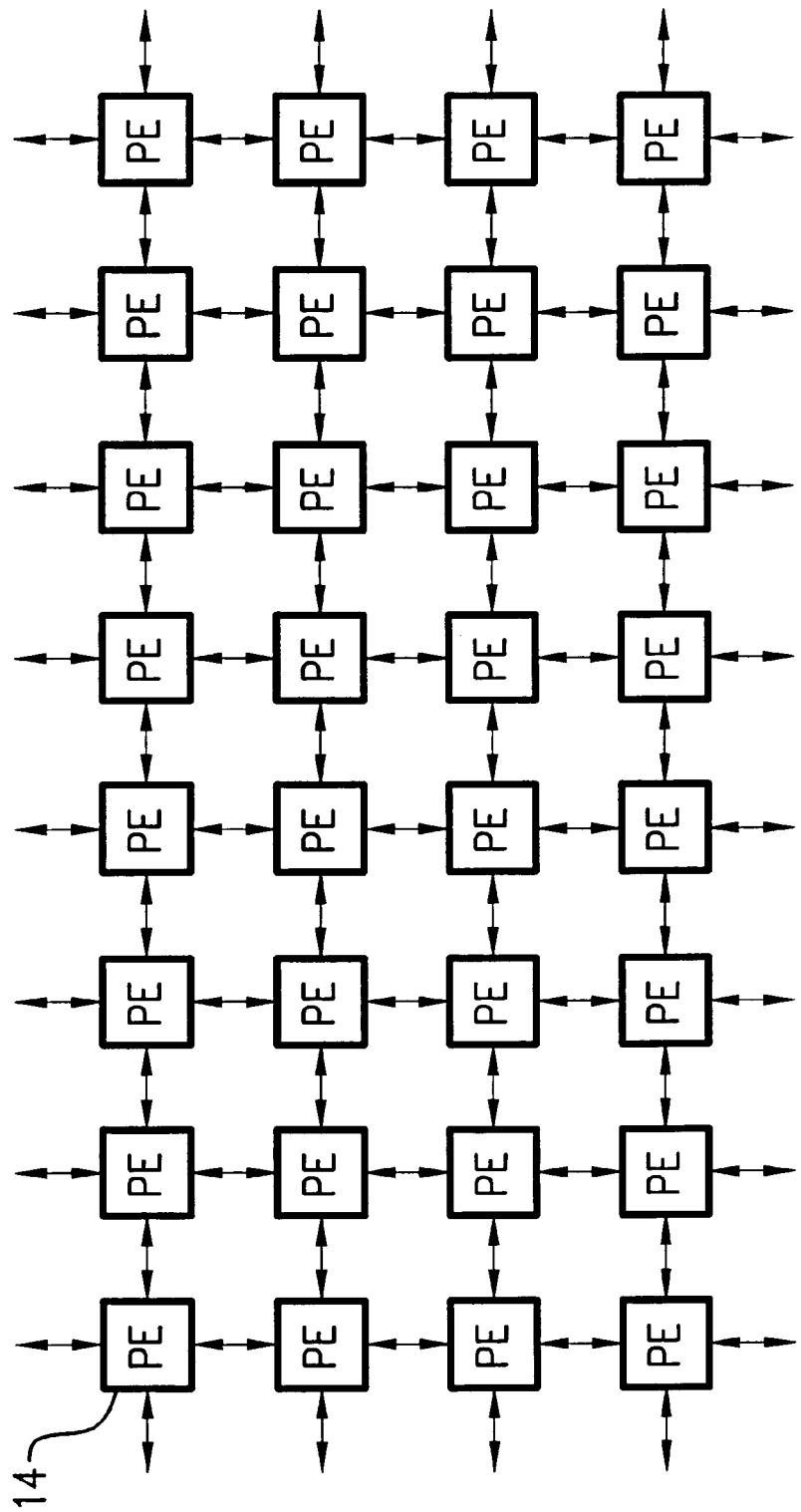
FIG. 3 illustrates in block diagram form a conventional PE interconnect architecture.
Figure 4:
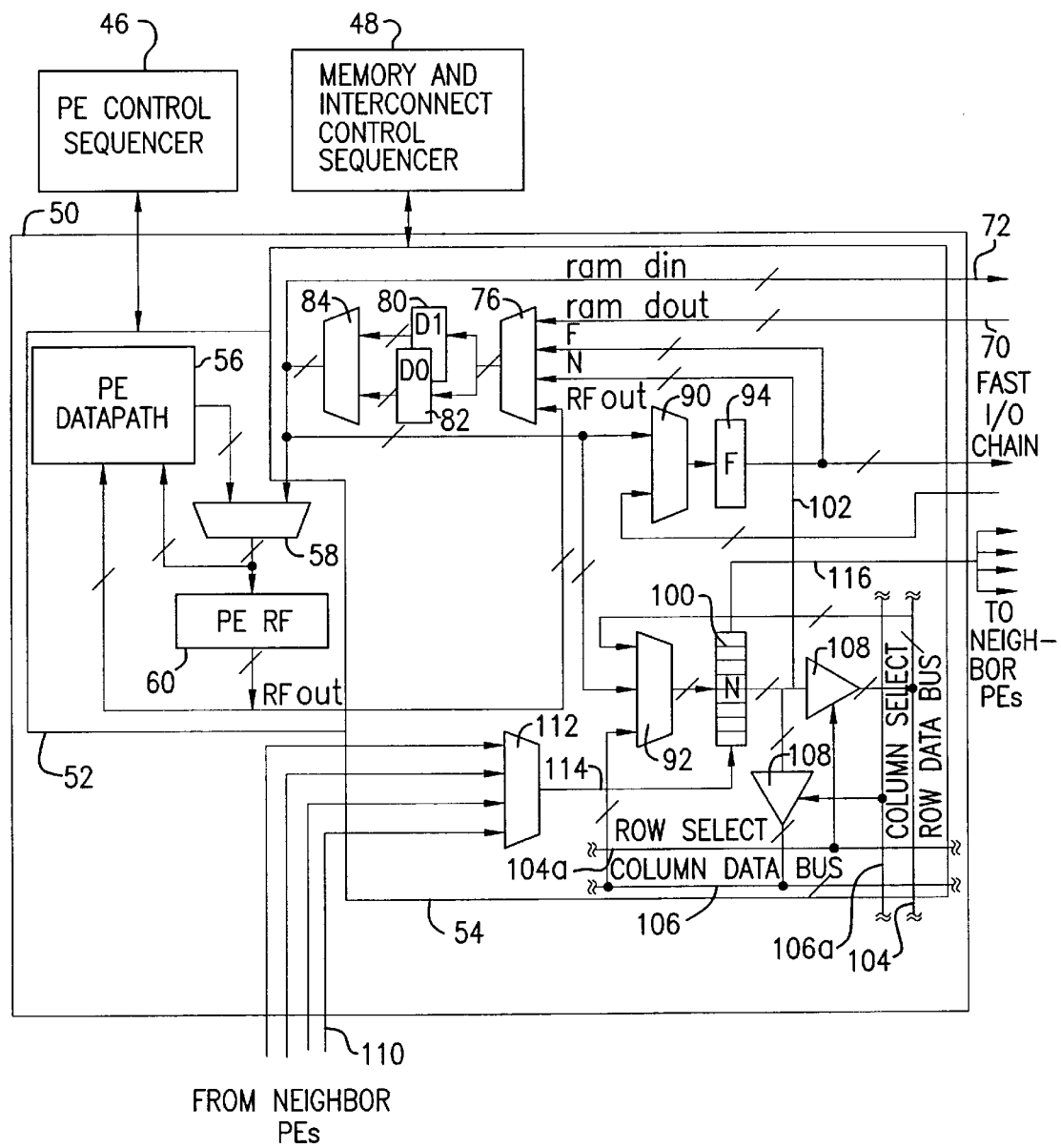
FIG. 4 illustrates a processing element (PE) having a shift register based interconnect in accordance with the present invention.

FIG. 4 illustrates in block diagram form a processing element (PE) 50 having a shift register based interconnect in accordance with the present invention. PE 50 may be used in the PE array as illustrated in FIG. 3. PE 50 is typically divided into two interconnected circuits. A first circuit 52 is controlled by a PE Control Sequencer 46 and a second circuit 54 is controlled by a Memory and Interconnect Control Sequencer 48.

The PE Control Sequencer 46, as is known in the art, directs processing of data in the computational core in each PE 50 of the PE array (as illustrated in FIG. 3). The PE Data Path 56 includes logic units, such as for example adders, multipliers, etc., which perform the processing, i.e., the logical operations, on data as directed by the PE Control Sequencer 46. The resulting output of the PE Datapath 56 is output to a first input of a multiplexer 58. Multiplexer 58 has a second input connected to receive a signal from circuit 54 of the PE 50 (described further below). The output from multiplexer 58 is input back into the PE Data path 56 and to a PE Register File (PE RF) 60. The output from the PE RF 60 is input back into the PE Datapath 56 and also provided to circuit 54 as described below.

Figure 2:
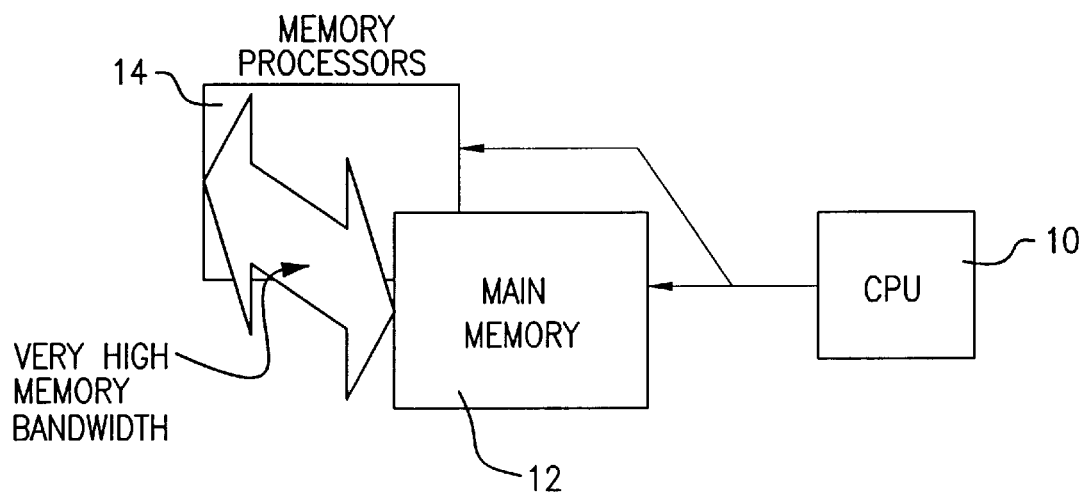
FIG. 2 illustrates in block diagram form the architecture of an active memory.

As noted above, circuit 54 is controlled by the Memory and Interconnect Control Sequencer 48 (hereinafter MemSeq). The MemSeq 48 controls movement within the PE array (as illustrated in FIG. 3) and to/from the portion of the main memory 12 (as illustrated in FIG. 2) associated with each PE 50. The MemSeq 48 executes code from a program memory to read and write data from and to its local portion of the memory 12, shift data within the PE interconnect network, i.e., the PE array as illustrated in FIG. 3, broadcast or broadcatch data through row/column buses of the PE array, and load/store registers in the interconnect portion of the PE 50 (further described below).

Circuit 54 includes an input bus 70 to receive data output from its associated portion of the memory 12 (ram dout) and an output bus 72 for sending data to its associated portion of the memory 12 (ram din). These buses are wide data buses, as indicated by the slash through the bus lines. For example, the buses may be an eight bit wide data bus. However, the invention is not so limited, and each bus may be any number of bits wide. The use of the wide buses within the PE 50 enables the PE 50 to increase the speed of its computations on data within PE 50. Input bus 70 is coupled to a multiplexer 76. The output of multiplexer 76 is input to buffer registers D1 80 and D2 82. Buffer registers D1 80 and D0 82 are preferably the same width as the data buses in PE 50. The output from each buffer register D1 80 and D0 82 is input to a multiplexer 84, the output of which is connected to the output bus 72 of PE 50 as well as a second input of multiplexer 58 of circuit 52. The output from multiplexer 84 is also connected to an input of multiplexers 90 and 92. The output of multiplexer 90 is input to a register 94 (F register). Mulitplexer 90 and F register 94 are used to perform very high speed input-output (Fast I/O Chain) with little impact on the processing performance of the processor array, as is known in the art. It should be understood that mulitplexer 90 and F register 94 may or may not be included.

In accordance with the present invention, a register 100 (hereinafter N register) is provided. N register 100 is a parallel loading register, i.e., it can be loaded from a wide data bus, such as for example eight bits wide, within the PE 50 from multiplexer 92, and its contents can be read into the D0 82 and D1 80 buffers via bus 102 through multiplexer 76. Additionally, N register 100 is connected to a row data bus 104 and a column data bus 106 through a respective tri-state buffer 108. The tri-state buffers 108 are controlled by a column select signal 106a and a row select signal 104a respectively. Thus, data in the N register 100 can be output on either the row data bus 104 or the column data bus 106. The row data bus 104 and column data bus 106 are also input to multiplexer 92. The row data bus 104 and column data bus 106 allow for the broadcast and broadcatch of data through the PE array 50. Thus, data can be broadcast along these paths such that the data will be received by all the PEs in a specified row or column of the array.

In accordance with the present invention, N register 100 is also utilized as a shift register to move data from one PE 50 to another PE 50 using a one bit wide serial interconnection. As illustrated in FIG. 3, each PE of the array is connected to its four neighbors. As illustrated in FIG. 4, the input 110 from each of the four neighbors is input to a multiplexer 112. As noted above, each input from a respective neighbor is a one bit wide interconnection. Data from one of the neighboring PEs, as selected by the multiplexer 112, is input to one end of N register 100 via a one bit wide line 114 at the same time the other end of N register 100 is driven out of PE 50 to its neighboring PEs via a one bit wide line 116. The other bits of the N register 100 are also shifted accordingly as a single bit from multiplexer 112 is entered into N register 100 and a single bit exits N register 100 via line 116. Thus, if for example N register 100 is an eight bit register, in eight such operations an entire byte, i.e., eight bits, can be moved from one PE 50 to a neighbor PE 50 as a new byte is loaded into the PE 50 from another neighbor PE 50. Since the data movement between neighbor PEs 50 of an array is performed using a bit serial mode of operation, the interconnections between the PEs in the array can use a single bit processing element, such as for example a simple network of wires. The use of the parallel loading N register 100 allows for use of a wider data path, such as for example eight bits wide, within the PE 50 to increase the speed of the computational performance of the PE 50.

Thus, in accordance with the present invention, a system and method for using wider data paths within the PEs to speed the computational performance of the PEs and the MPP array while still allowing for use of the simple 1-bit interconnection network to transfer data between PEs in the MPP is provided.

Figure 5:
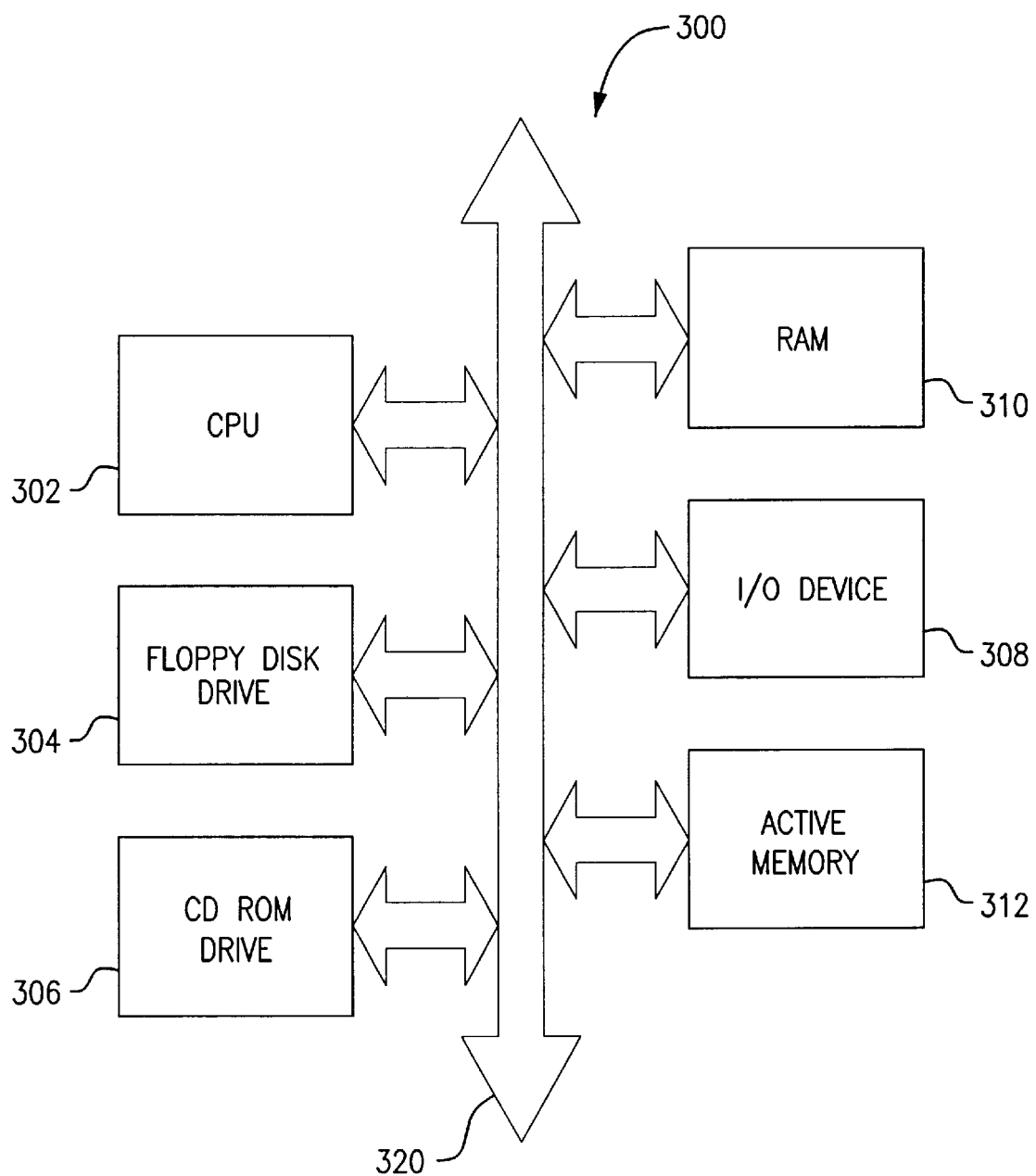
FIG. 5 illustrates in block diagram form a processor based system in which the present invention may be employed.

An active memory device 312 containing PEs 50 with the shift register based interconnection of the present invention may be used in a processor-based system 300 of the type shown in FIG. 5. The processor-based system 300 comprises a processor 302 that communicates with the memory device 312 and an I/O device 308 over a bus 320. It must be noted that the bus 320 may be a series of buses and bridges commonly used in a processor-based system, but for convenience purposes only, the bus 320 has been illustrated as a single bus. The memory device 312 includes an array of PEs 50 that utilize the shift register based interconnection as previously described with respect to FIG. 4. The memory device 312 may be a SIMD MPP or any other type of DRAM or SRAM utilizing multiple PEs. In addition, the processor 302 may itself be an integrated processor which utilizes on-chip memory devices containing the circuitry of the present invention.

The processor-based system 300 may be a computer system, a process control system or any other system employing a processor and associated memory. The processor-based system 300 may also include read-only memory (ROM) 310 and may include peripheral devices such as a floppy disk drive 304 and a compact disk (CD) ROM drive 306 that also communicate with the processor 302 over the bus 320 as is well known in the art.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A processing element for use in a massively parallel processor, said processing element comprising:
    a first data bus for receiving data from a portion of a main memory associated with said processing element;
    a second data bus for sending data to said portion of said main memory associated with said processing element;
    a plurality of internal data buses, each of said plurality of internal data buses having a width of a plurality of bits; and
    a register having a width of a plurality of bits, said register connected to at least one of said internal data buses, said width of said register being equal to said width of said at least one of said internal data buses, wherein each bit of said register can be loaded in parallel from said at least one of said internal data buses, said register further having a serial input at a first end for receiving a single bit from at least one neighboring processing element into a first bit of said plurality of bits of said register and a serial output at a second end of said register for sending to at least one neighboring processing element a single bit out from a last bit of said plurality of bits of said register.

2. The processing element according to claim 1, further comprising:
    a plurality of single bit inputs; and
    a first multiplexer having a plurality of inputs and an output, each of said plurality of inputs connected to a respective one of said plurality of single bit inputs, said output providing said single bit of data from a selected one of said plurality of single bit inputs to said serial input of said register.

3. The processing element according to claim 2, further comprising:
    a row data bus coupled to said register; and
    a column data bus coupled to said register.

4. The processing element according to claim 3, further comprising:
    a second mulitplexer having a first input coupled to said row data bus, a second input coupled to said column data bus, a third input coupled to said at least one of said internal data buses, and an output coupled to said register,
    wherein said register is parallel loaded from said output.

5. The processing element according to claim 1, further comprising:
    a data bus for sending and receiving data from a portion of a main memory associated with said processing element, said data bus having a width equal to said width of said plurality of internal data buses.

6. The processing element according to claim 1, wherein said plurality of bits is eight bits.

7. A memory device comprising:
    a main memory; and
    an array of a plurality of processing elements coupled to said main memory, each of said plurality of processing elements being associated with a respective portion of said main memory, each of said plurality of processing elements being connected by a single bit interconnection to a plurality of neighboring processing elements, each of said processing elements comprising:
    a plurality of multi-bit internal data buses; and
    a multi-bit register, said multi-bit register connected to at least one of said internal data buses, wherein each bit of said multi-bit register can be loaded in parallel from said at least one of said internal data buses, said multi-bit register further having a serial input at a first end for receiving a single bit of data from one of a plurality of neighboring processing elements into a first bit of said multi-bit register and a serial output at a second end of said register for sending a single bit of data to at least one of said plurality of neighboring processing elements.

8. The memory device according to claim 7, wherein each of said processing elements further comprises:
   a plurality of single bit inputs, each of said plurality of single bit inputs connected to a respective one of said plurality of neighboring processing elements; and
   a first multiplexer having a plurality of inputs and an output, each of said plurality of inputs connected to a respective one of said plurality of single bit inputs, said output providing said single bit of data from a selected one of said plurality of single bit inputs to said serial input of said multi-bit register.

9. The memory device according to claim 8, wherein said array of a plurality of processing elements further comprises:
   a plurality of row data buses, each of said plurality of row data buses coupled to each of said multi-bit registers of said plurality of processing elements along a respective row of said array; and
   a plurality of column data buses, each of said plurality of column data buses coupled to a plurality of said multi-bit registers of said plurality of processing elements along a respective column of said array.

10. The memory device according to claim 9, wherein each of said processing elements further comprises:
    a second mulitplexer having a first input coupled to its respective row data bus, a second input coupled to its respective column data bus, a third input coupled to said at least one of said internal data buses, and an output coupled to said multi-bit register,
    wherein said multi-bit register is parallel loaded from said output.

11. The memory device according to claim 7, further comprising:
    a plurality of data buses, each of said plurality of data buses sending and receiving data from a respective portion of said main memory associated with a respective one of said plurality of processing elements, each of said plurality of data buses being a multi-bit bus.

12. The memory device according to claim 7, wherein said multi-bit register is eight bits wide.

13. The memory device according to claim 7, further comprising:
    a first sequencer coupled to said plurality of processing elements, said first sequencer directing processing of data in each of said plurality of processing elements.

14. The memory device according to claim 13, further comprising:
    a second sequencer coupled to each of said plurality of processing elements, said second sequencer directing movement of data between each of said plurality of processing elements.

15. An active memory comprising:
    a main memory;
    a plurality of processing elements, each of said plurality of processing elements being associated with a respective portion of said main memory, each of said plurality of processing elements being connected to its respective portion of said main memory by one of a plurality of multi-bit data buses; and
    a single bit interconnection network connecting each of said plurality of processing elements to at least one other processing element,
    wherein each of said plurality of processing elements includes
    a multi-bit register coupled to said one of a plurality of multi-bit data buses, said multi-bit register being adapted to be parallel loaded with multiple bits of data from said one of a plurality of multi-bit data buses, said multi-bit register being further adapted to receive a single bit of data from and send a single bit of data to another of said plurality of processing elements using said single bit interconnection network.

16. The active memory according to claim 15, wherein each of said multi-bit registers further comprises:
    a serial input at a first end for receiving said single bit of data from said another of said plurality of processing; and
    a serial output at a second end for sending said single bit of data to said another of said plurality of processing elements.

17. The active memory according to claim 16, wherein each of said plurality of processing elements further comprises:
    a plurality of single bit inputs, each of said plurality of single bit inputs connected to a respective serial output of said multi-bit register of another of said plurality of processing elements; and
    a first multiplexer having a plurality of inputs and an output, each of said plurality of inputs connected to a respective one of said plurality of single bit inputs, said output providing said single bit of data from a selected one of said plurality of single bit inputs to said serial input of said multi-bit register.

18. The active memory according to claim 15, wherein each of said multi-bit registers is eight bits wide.

19. The active memory according to claim 15, further comprising:
    a first sequencer coupled to said plurality of processing elements, said first sequencer directing processing of data in each of said plurality of processing elements.

20. The active memory according to claim 19, further comprising:
    a second sequencer coupled to each of said plurality of processing elements, said second sequencer directing movement of data between each of said plurality of processing elements.

21. A processing system comprising:
    a processing unit; and
    a memory device coupled to said processing unit, said memory device comprising:
    a main memory; and
    an array of a plurality of processing elements coupled to said main memory, each of said plurality of processing elements being associated with a respective portion of said main memory, each of said plurality of processing elements being connected by a single bit interconnection to a plurality of neighboring processing elements, each of said processing elements comprising:
    a plurality of multi-bit internal data buses; and a multi-bit register, said multi-bit register connected to at least one of said internal data buses, wherein each bit of said multi-bit register can be loaded in parallel from said at least one of said internal data buses, said multi-bit register further having a serial input at a first end for receiving a single bit of data from one of a plurality of neighboring processing elements into a first bit of said multi-bit register and a serial output at a second end of said register for sending a single bit of data to at least one of said plurality of neighboring processing elements.

22. The processing system according to claim 21, wherein each of said processing elements further comprises:
   a plurality of single bit inputs, each of said plurality of single bit inputs connected to a respective one of said plurality of neighboring processing elements; and
   a first multiplexer having a plurality of inputs and an output, each of said plurality of inputs connected to a respective one of said plurality of single bit inputs, said output providing said single bit of data from a selected one of said plurality of single bit inputs to said serial input of said multi-bit register.

23. The processing system according to claim 22, wherein said array of a plurality of processing elements further comprises:
   a plurality of row data buses, each of said plurality of row data buses coupled to each of said multi-bit registers of said plurality of processing elements along a respective row of said array; and
   a plurality of column data buses, each of said plurality of column data buses coupled to a plurality of said multi-bit registers of said plurality of processing elements along a respective column of said array.

24. The processing system according to claim 23, wherein each of said processing elements further comprises:
   a second mulitplexer having a first input coupled to its respective row data bus, a second input coupled to its respective column data bus, a third input coupled to said at least one of said internal data buses, and an output coupled to said multi-bit register,
   wherein said multi-bit register is parallel loaded from said output.

25. The processing system according to claim 21, further comprising:
   a plurality of data buses, each of said plurality of data buses sending and receiving data from a respective portion of said main memory associated with a respective one of said plurality of processing elements, each of said plurality of data buses being a multi-bit bus.

26. The processing system according to claim 21, wherein said multi-bit register is eight bits wide.

27. The processing system according to claim 21, wherein said processing unit and said memory device are on a same chip.

28. The processing system according to claim 21, further comprising:
   a first sequencer coupled to said array of said plurality of processing elements, said first sequencer directing processing of data in each of said plurality of processing elements.

29. The processing system according to claim 28, further comprising:
   a second sequencer coupled to each of said plurality of processing elements, said second sequencer directing movement of data between each of said plurality of processing elements in said array.

30. A processing system comprising:
   a processing unit; and
   an active memory coupled to said processing unit, said active memory comprising:
      a main memory;
      a plurality of processing elements, each of said plurality of processing elements being associated with a respective portion of said main memory, each of said plurality of processing elements being connected to its respective portion of said main memory by one of a plurality of multi-bit data buses; and
      a single bit interconnection network connecting each of said plurality of processing elements to at least one other processing element,
   wherein each of said plurality of processing elements includes a multi-bit register coupled to said one of a plurality of multi-bit data buses, said multi-bit register being adapted to be parallel loaded with multiple bits of data from said one of a plurality of multi-bit data buses, said multi-bit register being further adapted to receive a single bit of data from and send a single bit of data to another of said plurality of processing elements using said single bit interconnection network.

31. The processing system according to claim 30, wherein each of said multi-bit registers further comprises:
   a serial input at a first end for receiving said single bit of data from said another of said plurality of processing; and
   a serial output at a second end for sending said single bit of data to said another of said plurality of processing elements.

32. The processing system according to claim 31, wherein each of said plurality of processing elements further comprises:
   a plurality of single bit inputs, each of said plurality of single bit inputs connected to a respective serial output of said multi-bit register of another of said plurality of processing elements; and
   a first multiplexer having a plurality of inputs and an output, each of said plurality of inputs connected to a respective one of said plurality of single bit inputs, said output providing said single bit of data from a selected one of said plurality of single bit inputs to said serial input of said multi-bit register.

33. The processing system according to claim 30, wherein each of said multi-bit registers is eight bits wide.

34. The processing system according to claim 30, further comprising:
   a first sequencer coupled to said plurality of processing elements, said first sequencer directing processing of data in each of said plurality of processing elements.

35. The processing system according to claim 34, further comprising:
   a second sequencer coupled to each of said plurality of processing elements, said second sequencer directing movement of data between each of said plurality of processing elements.

36. A method of operating a memory device comprising the steps of:
   parallel loading data in a multi-bit register of a first processing element from a portion of a main memory associated with the first processing element via one of a plurality of multi-bit data buses;
   receiving a first single bit of data from a second processing element via a single bit interconnection network;

loading said first single bit of data into a first bit of said multi-bit register;

shifting said data in said multi-bit register in response to said loading of said first single bit of data;

outputting a second single bit of data from a last bit of said multi-bit register to at least a third processing element via said single bit interconnection network.

37. The method according to claim 36, wherein said step of receiving a first single bit of data further comprises:

receiving a plurality of single bits of data, each of said plurality of single bits of data coming from a respective one of a plurality of processing elements; and selecting one of said plurality of single bits of data to load into said first bit of said multi-bit register.

38. The method according to claim 37, wherein said step of receiving a plurality of single bits of data further comprises:

receiving a single bit of data from four processing elements that neighbor said first processing element in an array of processing elements.

39. The method according to claim 38, wherein said step of outputting a second single bit of data further comprises:

outputting said second single bit of data to each of said four processing elements that neighbor said first processing element via said single bit interconnection network.

40. The method according to claim 36, wherein said step of parallel loading said data further comprises:

receiving a first set of data from a row data bus;

receiving a second set of data from a column data bus;

receiving a third set of data from a portion of said memory device; and selecting one of said first, second and third sets of data to parallel load into said multi-bit register.

41. The method according to claim 36, wherein said multi-bit register has a width of eight bits.

42. The method according to claim 36, wherein said memory device is an active memory device.

* * * * *